United States Patent [19]

Stierlin

[11] Patent Number: 5,291,754
[45] Date of Patent: Mar. 8, 1994

[54] EXPELLER WITH A GAS-BUBBLE PUMP

[76] Inventor: Hans Stierlin, c/o DAWP-Creatherm AG Müchwiesen 5, 8952 Schlieren, Switzerland

[21] Appl. No.: 598,708
[22] PCT Filed: Mar. 14, 1990
[86] PCT No.: PCT/CH90/00066
  § 371 Date: Jan. 29, 1992
  § 102(e) Date: Jan. 29, 1992
[87] PCT Pub. No.: WO90/10834
  PCT Pub. Date: Sep. 20, 1990

[30] Foreign Application Priority Data
  Mar. 14, 1989 [CH] Switzerland ............................ 930/89
[51] Int. Cl.⁵ .............................................. F25B 15/00
[52] U.S. Cl. ........................................ 62/487; 62/107; 417/208; 417/65
[58] Field of Search .................. 62/476, 490, 491, 487, 62/107, 110; 165/20; 417/65, 108, 118, 207, 208

[56] References Cited

U.S. PATENT DOCUMENTS

| | | | |
|---|---|---|---|
| 2,363,771 | 11/1944 | Bergholm | 417/208 |
| 2,894,380 | 7/1959 | Palmatier | 62/476 |
| 4,527,956 | 7/1985 | Baumberg | 417/65 |

*Primary Examiner*—Henry A. Bennet
*Assistant Examiner*—William C. Doerrler
*Attorney, Agent, or Firm*—Barnes & Thornburg

[57] ABSTRACT

The abstract concerns an expeller with six pump tubes positioned round the circumference of a circle. A weak refrigerant solution is conveyed through the tube by rising vapor bubbles. Heating is by means of sich flame tubes. To improve heat transfer, the pump tubes are welded to the flame tube. The pump tubes lead into an exhaust-gas flue and are located inside this flue. The hot exhaust gases can therefore transfer heat to the weak refrigerant solution.

4 Claims, 2 Drawing Sheets

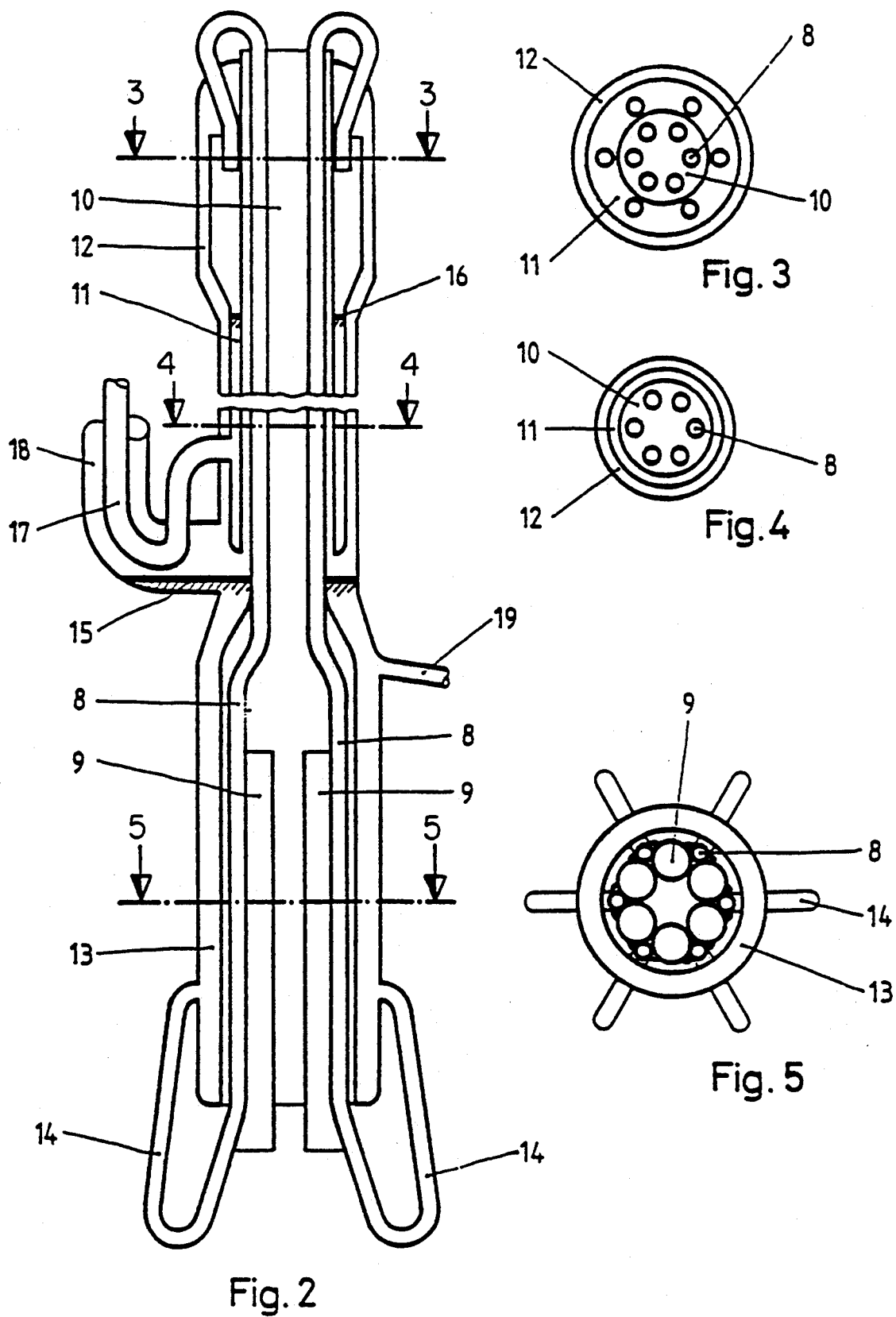

EXPELLER WITH A GAS-BUBBLE PUMP

BACKGROUND OF THE INVENTION

1. Field Of The Invention

The present invention relates to an expeller with a gas-bubble pump for a diffusion absorption plant.

2. Description Of The Prior Art

Diffusion absorption plants, i.e. absorption plants with a pressure equalizing auxiliary gas are known since a long time as small refrigeration plants for use in domestic refrigerators. These absorption refrigeration apparatuses have been decisively improved regarding their efficiency, such an apparatus is e.g. extensively described in the Swiss patent no. 475 527. The improvement of the efficiency has been reached substantially by the expeller disclosed therein. If the expeller is equipped with a gas-bubble pump such as is also the case of the plant of the mentioned patent, no moving parts such as e.g. motor driven solution pumps are necessary. The diffusion absorption plants used in domestic refrigerators display, however, a relatively low output. Therefore, they are not suitable for large plants, e.g. for an air conditioning or for use as heat pumps in heating plants.

In diffusion absorption plants of a large output it is also necessary to convey a large quantity of heat to the expeller. The gas-bubble pump must be designed such that it can pump the liquid to a considerable height in order to provide the solution turnover with the necessary driving force. The attempt to simply increase the expellers with gas-bubble pumps for diffusion absorption plants of a large output used in domestic refrigerators must fail since the pump tube of the gas-bubble pump is not allowed to exceed a certain diameter because otherwise the slip between the gas bubbles and the liquid to be conveyed is too large and only quite small pumping heights are reached. It must be noted, additionally, that the gas-bubble pump is not only able to function in the operating state but handles also the quite critical starting process during the start-up.

SUMMARY OF THE INVENTION

Accordingly, it is the object of the present invention to provide an expeller with a gas-bubble pump for use in diffusion absorption plants of a large output.

An object is to provide an expeller with a gas-bubble pump of the kind mentioned above, in which three or more pump tubes are arranged on an arc of a circle, whereby a same number of flame tubes, alternating with the pump tubes are also arranged on a circle and contact same.

BRIEF DESCRIPTION OF THE DRAWINGS

The invention will be better understood and objects other than those set forth above will become apparent when consideration is given to the following detailed description thereof. Such description makes reference to the annexed drawing wherein:

FIG. 2 is a longitudinal section of the expeller with a gas-bubble pump;

FIG. 3 is a cross section at the upper,

FIG. 4 is at the center and

FIG. 5 is at the lower area of the expeller with a gas-bubble pump.

DETAILED DESCRIPTION OF THE PREFERRED EMBODIMENT

Figure 1:
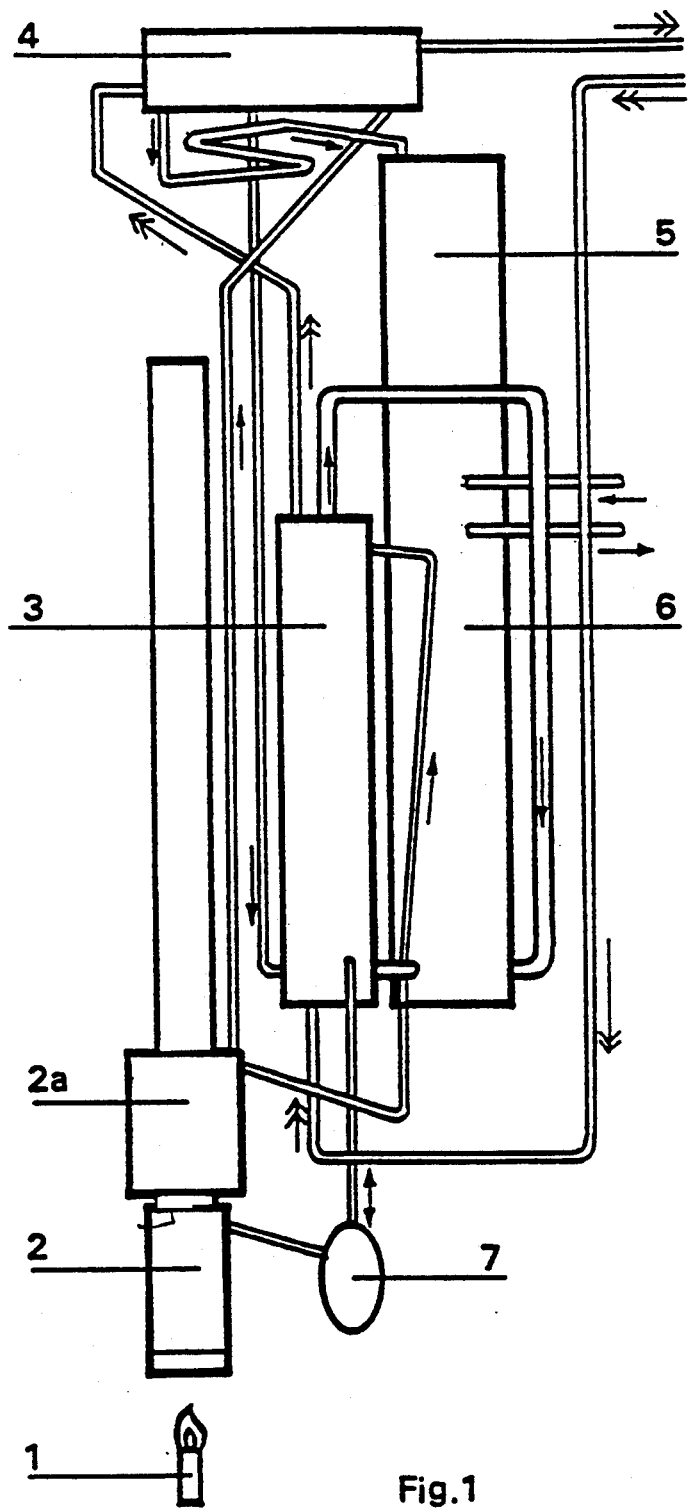
FIG. 1 is a schematic illustration of a diffusion absorption plant of a large output having an expeller and a gas-bubble pump in accordance with this invention.

The scheme of a diffusion absorption plant of a large output is illustrated in FIG. 1. Such an apparatus includes a gas burner 1 or another heat source, an expeller with a gas-bubble pump, in which the refrigerant vapor is driven out. This vapor arrives via a triple heat exchanger 2a through a vapor conduit in the condenser 4. Here the refrigerant vapor condenses and the condensate flows through a condensate conduit into an evaporator 5, where it evaporates at a simultaneous absorption of heat. The auxiliary gas which has become rich due to the evaporation flows into a gas heat exchanger 6 and cools there the inflowing weak gas. The rich gas flows thereafter into an absorber 3 where a part of the refrigerant vapor is absorbed by the weak solution. The solution which has grown rich by the process of the absorption reaches via the triple heat exchanger 2a the expeller 2. The refrigerant is here driven out such as mentioned and the solution which thereby has gotten weak is pumped upwards by means of the gas-bubble pump and accordingly brought into the condition to flow on the top into the absorber, whereby the weak solution prior to this is also guided through the triple heat exchanger 2a. The medium of a secondary system flows also through the absorber 3 and the condenser, which medium absorbs there heat at a high temperature level. A medium of a further secondary system flows through the evaporator 5 which supplies it with heat at a low temperature level.

In the embodiment of the expeller with a gas-bubble pump six pump tubes arranged on a circle are foreseen (FIGS. 3 to 5). In the lower area of the apparatus six flame tubes 9 are also arranged on a circle and specifically such that a given flame tube always contacts two pump tubes 8 (FIG. 4). Each flame tube 9 is heated by one gas burner or other heating device. The pump tubes 8 are each welded onto two adjoining flame tubes 9. The use of a plurality of pump tubes 8 allows to design their diameter sufficiently small in order to attain the necessary pumping height. Because the gas bubbles generated in the expeller are comparatively small, they transport during the rising in tubes of a large diameter only little liquid because they merely rise in the liquid column and do not entrain any liquid. In order to achieve a sufficient output of the pump it is thus necessary to foresee a plurality of pump tubes, but a mere parallel arrangement of common gas-bubble pumps does not lead to a useful solution regarding the operational safety and the efficiency. The specific arrangement of the pump tubes 8, namely circularly and alternating with the circularly arranged flame tubes 9 leads to a loose thermical coupling among all pump tubes. This is, however, extraordinarily advantageous. During normal operation all pump tubes are supplied with approximately the same amount of heat, even then when the gas flames in the flame tubes 9 have somewhat differing outputs. It even has been proven that the expeller still functions reliably when one or more gas flames fail because each pump tube 8 is heated by two flame tubes. It is, therefore, possible to foresee an operation at a reduced output, in that only every second flame tube is heated. This arrangement displays also advantages in case of occurrence of a feared trouble, namely the clogging of a pump tube. The arrangement which has been selected here prevents an overheating in this situation because due to the loose thermal coupling sufficient heat can be transported off, in that it is led to the intact pump tubes. Such as may be seen in FIG. 2 the flame tubes 9 open into a flue 10, the pump tubes 8 extend inside of this flue 10 such that the hot exhaust gases can deliver heat to the pump tubes. This leads to an extraordinary low exit temperature of the exhaust gases and improves the efficiency decisively.

The weak solution pumped up through the pump tubes 8 flows finally into the liquid chamber 11. During the state of operation the weak solution has in there a level 16. The expelled refrigerant vapor is in the vapor chamber 12. The vapor and the weak liquid are are led downwards in their chambers and thereafter the liquid is led through an inner tube 17 and the vapor through an outer tube 18 into the triple heat exchanger 2a (FIG. 1). The vapor reaches finally the condenser and the weak liquid the upper inlet of the absorber 3. The rich liquid out of the absorber 3 is also led through the triple heat exchanger 2a and arrives finally via the outer tube 18 into the suction chamber 13 of the expeller. Six elbows 14 guide finally the rich liquid from the suction chamber 13 into the pump tubes 8. In the state of operation the rich liquid has in the suction chamber 13 a level 15. An equalizing pipe 19 extends to a reservoir which secures this level. Mentioned triple heat exchanger is extensively described in the CH-Patent 475 527, specifically in connection with FIG. 9 illustrated therein.

By means of the apparatus disclosed in this embodiment it is possible to attain pumping heights considerably higher than one meter at a maintaining of the best efficiencies ever reached in diffusion absorption plants and at a high safety of operation. By means of such a decisive element for the production of diffusion absorption plants of large output has been provided.

While there is shown and descriped a present preferred embodiment of the invention, it is to be distinctly understood that the invention is not limited thereto, but may be otherwise variously embodied and practiced within the scope of the following claims.

We claim:

1. An expeller with a gas-bubble pump for a diffusion absorption plant, comprising three or more pump tubes, arranged in a circle and the same number of flame tubes also arranged in a circle, alternating with the pump tubes wherein each of said flame tubes is contacting at least two of said pump tubes and each of said pump tubes is contacting at least two of said flame tubes.

2. The expeller with a gas-bubble pump according to claim 1, wherein the pump tubes are welded to the flame tubes at the locations of contact.

3. The expeller with a gas-bubble pump according to claim 1, where said flame tubes include upper ends opening into a flue and wherein said pump tubes extend into said flue.

4. The expeller with a gas-bubble pump of claim 2, wherein said flame tubes include upper ends opening into a flue and wherein said pump tubes extend into said flue.

* * * * *